United States Patent
Matsunami (10) Patent No.: US 7,213,627 B2
(45) Date of Patent: May 8, 2007

(54) TIRE FOR MOTORCYCLE

(75) Inventor: Toshiyuki Matsunami, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 413 days.

(21) Appl. No.: 10/863,343

(22) Filed: Jun. 9, 2004

(65) Prior Publication Data

US 2004/0250938 A1    Dec. 16, 2004

(30) Foreign Application Priority Data

Jun. 16, 2003    (JP) .............................. 2003-170523

(51) Int. Cl.
    *B60C 15/00*    (2006.01)
(52) U.S. Cl. ...................... 152/552; 152/550; 152/553; 152/554
(58) Field of Classification Search ................ 152/526, 152/531, 533, 552, 554, 550
    See application file for complete search history.

(56) References Cited

U.S. PATENT DOCUMENTS 5,379,818 A    1/1995  Suzuki et al.
5,441,093 A    8/1995  Shirasyouji et al.
6,026,878 A    2/2000  Zhang et al.

FOREIGN PATENT DOCUMENTS

| EP | 0113578 | * | 7/1984 |
| EP | 0 549 311 A1 | | 6/1993 |
| EP | 0 635 383 A1 | | 1/1995 |
| JP | 05-246210 A | | 9/1993 |
| JP | 10-181310 A | | 7/1998 |
| JP | 2000-233604 | * | 8/2000 |

* cited by examiner

Primary Examiner—Justin R. Fischer
(74) Attorney, Agent, or Firm—Birch, Stewart, Kolasch & Birch, LLP (57) ABSTRACT

A tire which includes a carcass ply and a band ply for reinforcing the carcass ply, the carcass ply having an inner ply and an outer ply which are provided in a radial direction, the inner ply being wound from an inside toward an outside in the axial direction of a bead core to constitute a fold-back portion and the outer ply being provided to cover the inner ply. A width (JW) of the band ply is set to be 80% to 98% of a tread width (TW) and an overlap dimension (LW) of the fold-back portion and the band ply is set to be 15% to 35% of the width (JW) of the band ply.

5 Claims, 4 Drawing Sheets

TIRE FOR MOTORCYCLE

This Nonprovisional application claims priority under 35 U.S.C. § 119(a) on Patent Application No(s). 2003-170523 filed in Japan on Jun. 16, 2003, the entire contents of which are hereby incorporated by reference.

BACKGROUND OF THE INVENTION

1. Field of the Invention

The present invention relates to a structure of a tire for a motorcycle.

2. Description of the Related Art

In recent years, a motorcycle can carry out high speed running and the size and weight have been increased. This is caused by an increase in the amount of exhaust from the engine. For this reason, an enhancement in the performance of the tire for the motorcycle (the realization of a high straight running stability and a high cornering stability) has increasingly been required in order to withstand the high speed running of the motorcycle.

In the motorcycle, a body is greatly inclined during cornering. Therefore, the tire for the motorcycle is also inclined and rolled with respect to a road surface. Accordingly, the tire for the motorcycle is to be designed in such a manner that a cornering force and a camber thrust are properly generated.

In the case in which only the cornering of the motorcycle is taken into consideration, a shoulder portion in the tire for the motorcycle is set to have a high stiffness. Consequently, stable cornering can be implemented. In the tire for the motorcycle, however, the stiffness of a tread portion is generally improved with an enhancement in the stiffness of the shoulder portion. Consequently, in the case in which the motorcycle carries out straight running, there is a tendency that the stiffness of the tread portion of the tire for the motorcycle is excessively increased so that the straight running stability of the motorcycle is deteriorated.

Under such circumstances, conventionally, the tire for the motorcycle has been required to maintain the high stiffness of the shoulder portion and a more reduced stiffness of the tread portion (particularly, a central part) as compared with the shoulder portion.

For this reason, various improvements have conventionally been made for the structure of the tire for the motorcycle.

In a tire for a motorcycle which has conventionally been provided in order to obtain the compatibility of the straight running stability with the cornering stability, an enhancement in the stiffness of the shoulder portion is not always balanced with a reduction in the stiffness of the tread portion so that the straight running stability and the cornering stability are not always compatible with each other at a high level. Moreover, the structural unification of the tread portion and the shoulder portion is not always achieved. For this reason, a running condition for a transition period from straight running to cornering (or from the cornering to the straight running) holds a linearity with difficulty.

SUMMARY OF THE INVENTION

The present invention has been made in such a background. It is a first object of the present invention to provide a tire for a motorcycle in which a straight running stability and a cornering stability in the motorcycle are compatible with each other at a high level. It is a second object of the present invention to provide a tire for a motorcycle in which a transition state from straight running to cornering or from the cornering to the straight running in the motorcycle exhibits an excellent linearity.

A tire for a motorcycle according to the present invention has the following structure.

(1) First Carcass Ply

A first carcass ply is formed along a tread surface and is provided with a fold-back portion by winding upon a pair of bead cores disposed opposite to each other in an axial direction of the tire from an inside toward an outside in the axial direction.

(2) Second Carcass Ply

A second carcass ply is formed along the tread surface and is provided on an outside of the first carcass ply in a radial direction of the tire.

(3) Band Ply

A band ply is formed along the tread surface and is provided on an outside of the second carcass ply in the radial direction.

Each of the first and second carcass plies has a carcass cord provided to cross a tire equator plane at an angle having an absolute value of 65 to 90 degrees. The band ply has a band cord which crosses the tire equator plane at an angle having an absolute value of 10 degrees or less and is wound spirally. The band ply is provided in such a manner that a width is set to be 80% to 98% of a tread width and an overlap dimension with the fold-back portion of the first carcass ply is set to be 15% to 35% of the width of the band ply.

According to this structure, the carcass cord included in the first carcass ply and the second carcass ply crosses the tire equator plane at an angle of 65 to 90 degrees. Consequently, the stiffness of the tread surface (particularly, the stiffness of a grounded portion) can be enhanced. Accordingly, the tire can correspond to a motorcycle having a size and a weight increased.

The first carcass ply has the fold-back portion which is wound upon the bead core and is thus folded back. The second carcass ply is provided to surround the fold-back portion. In addition, the width of the band ply is set to be 80% to 98% of the tread width. Consequently, the band ply surrounds the first and second carcass plies and is provided in almost the whole region of the tread surface including the shoulder portion of the tire. Accordingly, the stiffness of the shoulder portion can be enhanced so that the cornering stability of the tire can be improved in the running of the motorcycle.

The band ply is caused to overlap with the fold-back portion. An overlap dimension is set to be 15% to 35% of the width of the band ply. Therefore, the shoulder portion and the tread portion of the tire are provided smoothly and continuously on a structure basis. Accordingly, the tire maintains the linearity of the running condition also for a transition period in which the motorcycle changes the running condition from straight running to cornering or from the cornering to the straight running.

In the present invention, the tread width is measured along the tread surface, the width of the band ply is measured along the tread surface, and the overlap dimension of the band ply and the fold-back portion of the first carcass ply is measured along the tread surface.

The band cord can be constituted by an organic fiber or steel.

An end of the second carcass ply can be provided on an outside in the axial direction of the fold-back portion of the first carcass ply. The tire has a so-called (1–1–0) structure.

The end of the second carcass ply may be inserted in the fold-back portion of the first carcass ply. In this case, the tire has a so-called (1+1–0) structure.

In the present invention, the straight running stability, the cornering stability, and the linearity of the running condition for a transition period between the straight running and the cornering in the running of the motorcycle can be implemented at a high level. Accordingly, the tire for the motorcycle according to the present invention is suitably applied to a motorcycle having a great weight and carrying out high speed running so that a handling stability and a ride comfort can be enhanced.

BRIEF DESCRIPTION OF THE DRAWINGS

The present invention will become more fully understood from the detailed description given hereinbelow and the accompanying drawing, which are given by way of illustration only, and thus are not limitative of the present invention, and wherein.

DESCRIPTION OF THE PREFERRED EMBODIMENTS

The present invention will be described below in detail based on a preferred embodiment with reference to the drawings.

Figure 1:
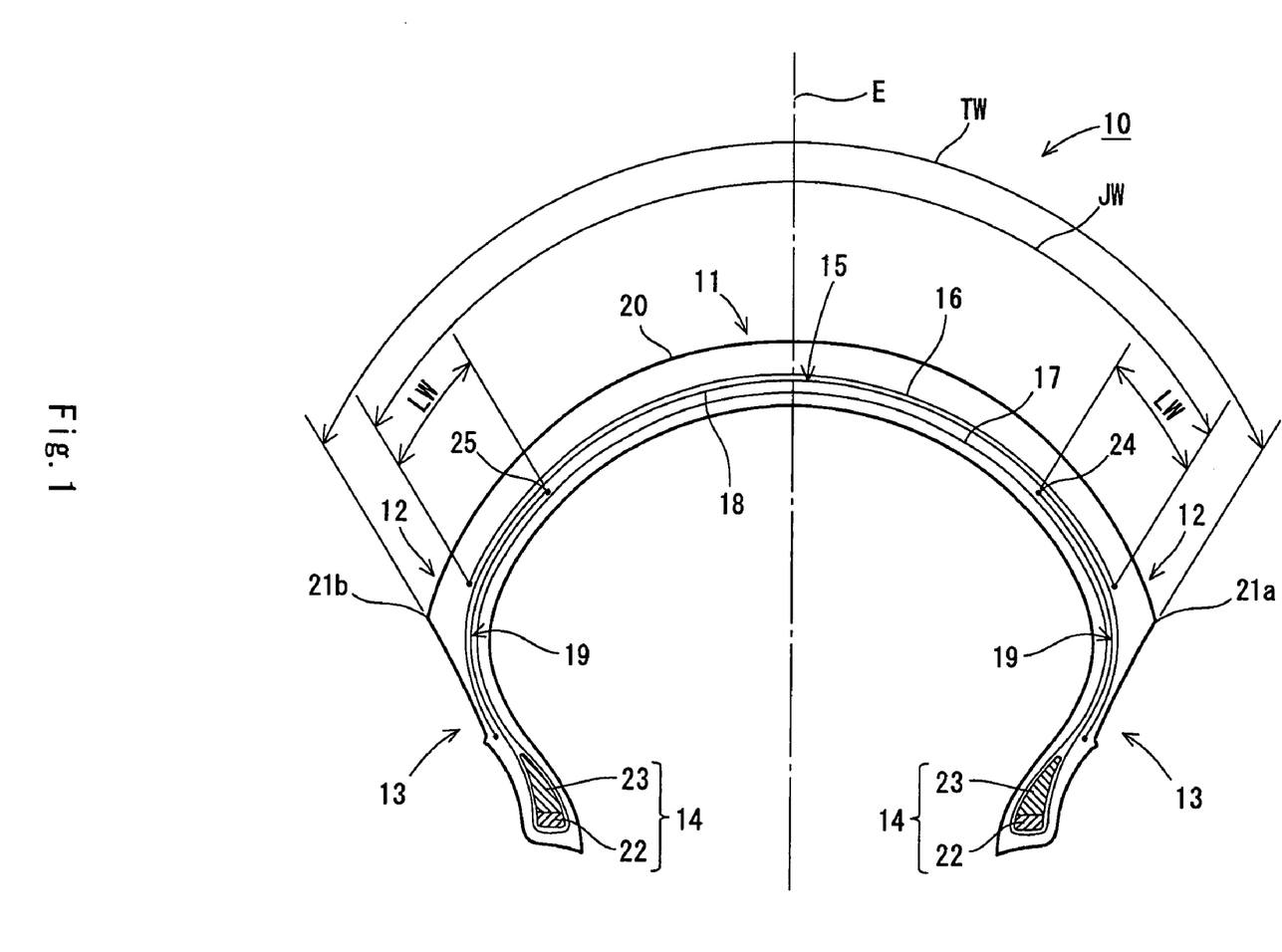
FIG. 1 is a sectional view showing the main part of the structure of a tire according to an embodiment of the present invention.

FIG. 1 shows a section passing through the center of a tire 10 for a motorcycle according to an embodiment of the present invention (which will be hereinafter referred to as a "tire") and taken along a plane which is orthogonal to an equator plane E of the tire 10. In FIG. 1, a vertical direction indicates a radial direction of the tire 10 and a transverse direction indicates an axial direction of the tire 10.

The tire 10 takes an almost symmetrical shape about the equator plane E excluding a tread pattern. The tire 10 has a tread portion 11, a pair of shoulder portions 12 formed on both sides of the tread portion 11 (both sides in the axial direction of the tire 10), and a pair of sidewall portions 13 and a pair of bead portions 14 which are linked thereto. The tire 10 is integrally constituted by the tread portion 11, the shoulder portion 12, the sidewall portion 13 and the bead portion 14. A carcass 15 and a band 16 are formed in the tire 10. These are present as a carcass ply and a band ply which are formed in the tire 10, respectively. The carcass 15 and the band 16 will be hereinafter referred to as a carcass ply 15 and a band ply 16, respectively.

The tire 10 according to the present embodiment features that:

(1) the carcass ply 15 has an inner ply 17 (a first carcass ply) and an outer ply 18 (a second carcass ply), and the inner ply 17 is folded back in the bead portion 14 so that a fold-back portion 19 is formed;

(2) the band ply 16 is provided in almost the whole region of the inside of a tread surface 20 of the tread portion 11; and (3) the band ply 16 overlaps with the fold-back portion 19 by a predetermined distance.

As shown in FIG. 1, in the tire 10 according to the present embodiment, a tread width TW indicates a distance between the outer ends of the shoulder portions 12. In other words, the tread width TW indicates a distance between edgemost portions 21a and 21b which is measured along the tread surface 20. Moreover, a width JW of the band ply 16 indicates a distance which is measured along the tread surface 20. Furthermore, an overlap dimension LW of the fold-back portion 19 and the band ply 16 indicates a length of an overlap portion of both ends of the band ply 16 and each fold-back portion 19. The overlap dimension LW is measured along the tread surface 20.

It is assumed that the tread width TW, the width JW of the band ply 16 and the overlap dimension LW are measured in a state in which the tire 10 is cut through a virtual cutting surface in the radial direction.

The tread portion 11 is formed of a cross-linked rubber. More specifically, a stirene-butadiene rubber (SBR) can be employed, for example. It is a matter of course that the rubber constituting the tread portion 11 is not restricted to the stirene-butadiene rubber (SBR). The tread surface 20 comes in contact with a road surface. The tread surface 20 is provided with a tread pattern (not shown) formed by a groove portion and a land portion. The specific structure of the tread pattern can be employed variously.

The tread surface 20 is formed to take the shape of an arch to be outward convex in the radial direction. When the motorcycle carries out cornering, a driver inclines the motorcycle inward in a cornering direction. At this time, the tire 10 is grounded at a camber angle with the road surface. A camber thrust is generated on the contact surface of the tire 10. The camber thrust is opposed to a centrifugal force generated during the cornering of the motorcycle. By this force, the motorcycle carries out stable cornering. Thus, the tread surface 20 is formed to draw a large arch as shown in FIG. 1 in such a manner that a stable camber thrust is generated.

The sidewall portion 13 is continuously linked to the tread portion 11 and is extended inward in the radial direction from both ends of the tread portion 11. A portion in which the sidewall portion 13 and the tread portion 11 are continuously provided constitutes the shoulder portion 12. In the present embodiment, the shoulder portion 12 is formed in such a manner that the edgemost portions 21a and 21b are protruded in the axial direction as shown in FIG. 1. The shoulder portion 12 and the sidewall portion 13 are also constituted by a cross-linked rubber. The sidewall portion 13 absorbs a shock from the road surface by a flexure. The sidewall portion 13 protects the carcass ply 15 to prevent an external damage. Furthermore, the shoulder portion 12 is constituted so that the stiffness (particularly, the lateral stiffness) of the tire 10 can be enhanced.

The bead portion 14 is continuously formed with the sidewall portion 13. The bead portion 14 includes a bead core 22 and a bead apex 23 extended outward in the radial direction from the bead core 22. The bead core 22 is formed annularly and is constituted by a plurality of non-extensible wires (typically, wires formed of steel). The bead apex 23 is formed like a taper which is tapered outward in the radial direction, and is formed of a cross-linked rubber.

As shown in FIG. 1, the carcass ply 15 is formed along the tread portion 11 (more specifically, the tread surface 20), and furthermore, is extended along the shoulder portion 12, the sidewall portion 13 and the bead portion 14. The carcass ply 15 includes the inner ply 17 and the outer ply 18 as described above.

The inner ply 17 is formed symmetrically in the axial direction about the equator plane E. The inner ply 17 is wound from an inside in the axial direction of the tire 10 to an outside in the axial direction through the bead core 22. In other words, the inner ply 17 is wound upon the bead core 22 from the inside toward the outside in the axial direction and is wound up along the sidewall portion 13 by a predetermined length. Both ends 24 and 25 of the inner ply 17 are caused to overlap with the inner ply 17 and an overlap portion constitutes the fold-back portion 19.

The outer ply 18 is provided to cover the inner ply 17. More specifically, the outer ply 18 is provided on an outside in the radial direction of the inner ply 17 and is formed symmetrically in the axial direction about the equator plane E. Both ends of the outer ply 18 are provided on an outside in the axial direction of the fold-back portion 19. The outer ply 18 surrounds the inner ply 17.

Thus, the inner ply 17 and the outer ply 18 are formed. Consequently, the stiffness of the sidewall 13 can be enhanced sufficiently.

The band ply 16 is provided along the tread portion 11 on an outside in the radial direction of the carcass ply 15. The band ply 16 tightens and reinforces the carcass ply 15 in the radial direction. The band ply 16 is formed in the central part of the tread portion 11 and is provided symmetrically about the equator plane E as shown in FIG. 1. The width JW of the band ply 16 is set to be 87% of the tread width TW in the present embodiment. However, the width JW is not restricted to the same value but can be properly set within a range of 80% to 98% of the tread width TW.

The band ply 16 is formed as described above so that the band ply 16 and the fold-back portion 19 overlap with each other. In the present embodiment, the overlap dimension LW is set to be 20 mm. However, the overlap dimension LW is not restricted to the same value but can be properly set within a range of 15% to 35% of the width JW of the band ply 16.

In the present embodiment, each of the inner ply 17, the outer ply 18 and the band ply 16 is formed by a single layer but may include a plurality of layers. More specifically, for the inner ply 17, the outer ply 18 and the band ply 16, a carcass sheet (a sheet-shaped member) constituting the inner ply 17, a carcass sheet (a sheet-shaped member) constituting the outer ply 18 and a sheet-shaped or band-shaped member constituting the band ply 16 are previously arranged in predetermined positions when the tire 10 is to be formed. At this time, each of the plies 16 to 18 may be constituted by a plurality of members. Consequently, each of the inner ply, the outer ply and the band ply of the manufactured tire forms a plurality of layers.

In the case in which each of the inner ply 17, the outer ply 18 and the band ply 16 includes a single layer as in the present embodiment, the tire 10 can easily be manufactured, and furthermore, the weight of the tire 10 can be prevented from being increased. In particular, the band ply 16 is formed as an outermost layer in the radial direction. Consequently, the band ply 16 is formed as a single layer so that the weight of the tire 10 can be decreased and the moment of inertia of the tire 10 can be reduced.

Figure 2:
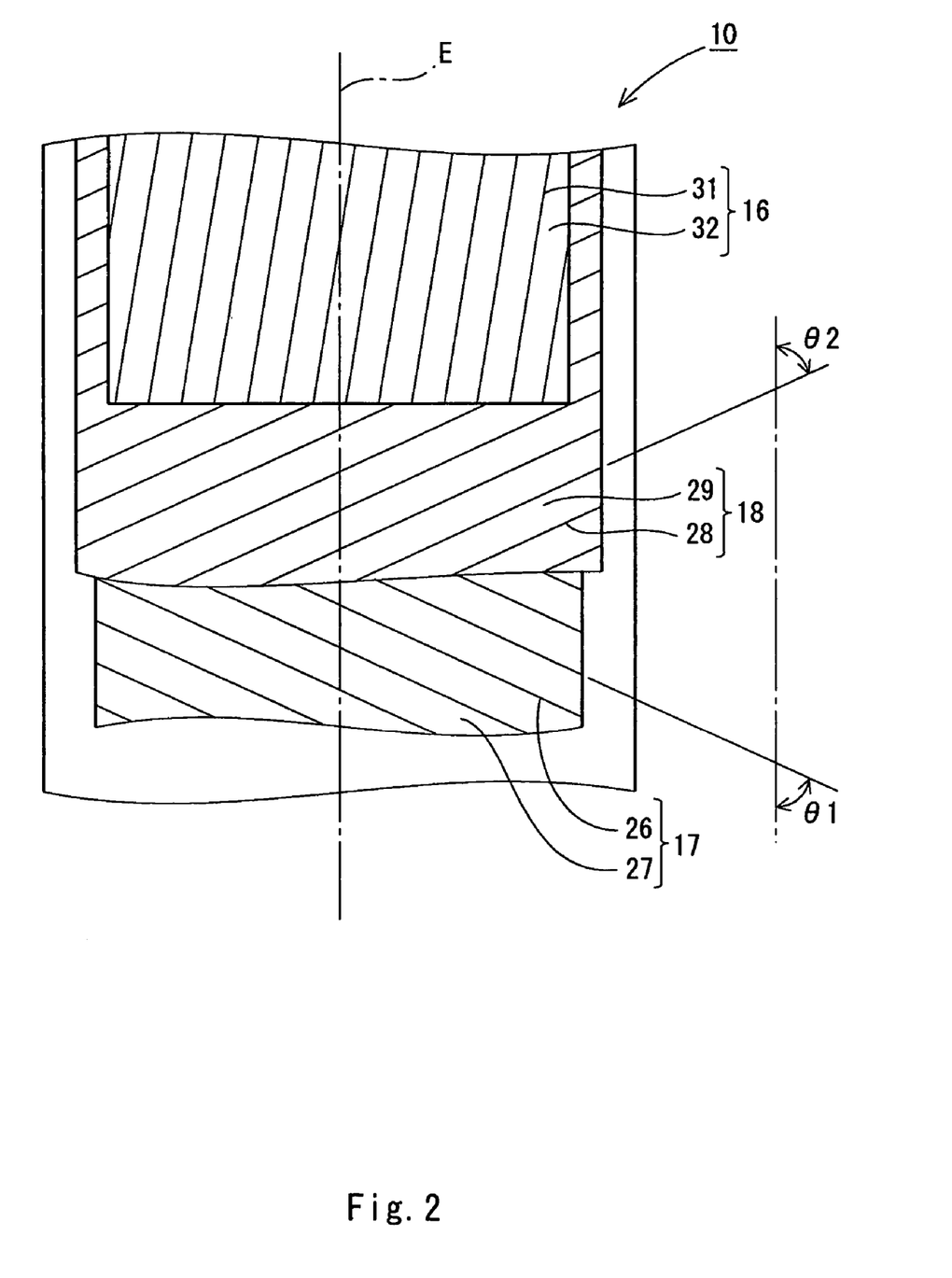
FIG. 2 is a plan view showing the main part of the tire according to the embodiment of the present invention.

As shown in FIG. 2, the outer ply 18 is provided on the inner ply 17 (the outside in the radial direction). The band ply 16 is provided on the outer ply 18 (the outside in the radial direction). The inner ply 17 includes a plurality of carcass cords 26. The carcass cord 26 is previously covered with a topping rubber sheet 27 and is thus aligned. The topping rubber sheet 27 is fused with other portions when the tire 10 is to be formed.

The carcass cord 26 is provided to cross the equator plane E (in the circumferential direction of the tire 10) at an angle $\theta 1$. In the present embodiment, $\theta 1=67$ degrees is set. Indeed, $\theta 1$ can be properly set within a range of 65 to 90 degrees. It is sufficient that the angle $\theta 1$ is set to have an absolute value of 65 to 90 degrees. Accordingly, the angle $\theta 1$ can also be set within a range of $-65$ to $-90$ degrees with respect to the equator plane E.

The outer ply 18 includes a plurality of carcass cords 28. The carcass cord 28 has the same structure as that of the carcass cord 26 constituting the inner ply 17. The carcass cord 28 is previously covered with a topping rubber sheet 29 and is thus aligned. The topping rubber sheet 29 has the same structure as that of the topping rubber sheet 27 constituting the inner ply 17 and is fused with other portions when the tire 10 is to be formed.

The carcass cord 28 is provided to cross the equator plane E (in the circumferential direction of the tire 10) at an angle $\theta 2$. In the present embodiment, $\theta 2=-67$ degrees is set. Indeed, $\theta 2$ can be properly set within a range of $-65$ to $-90$ degrees. It is sufficient that the angle $\theta 2$ is set to have an absolute value of 65 to 90 degrees. Accordingly, the angle $\theta 2$ can also be set within a range of 65 to 90 degrees with respect to the equator plane E.

In the present embodiment, the carcass cords 26 and 28 are constituted by nylon fibers. For a material constituting the carcass cord 26, indeed, it is possible to employ organic fibers such as rayon fibers and aromatic polyamide fibers in addition to the nylon fibers.

The band ply 16 includes a band cord 31. The band cord 31 is a single long member. The band cord 31 is wound along a circumferential direction. In other words, the band cord 31 is wound so that the inner ply 17 and the outer ply 18 are tightened and reinforced.

Figure 3:
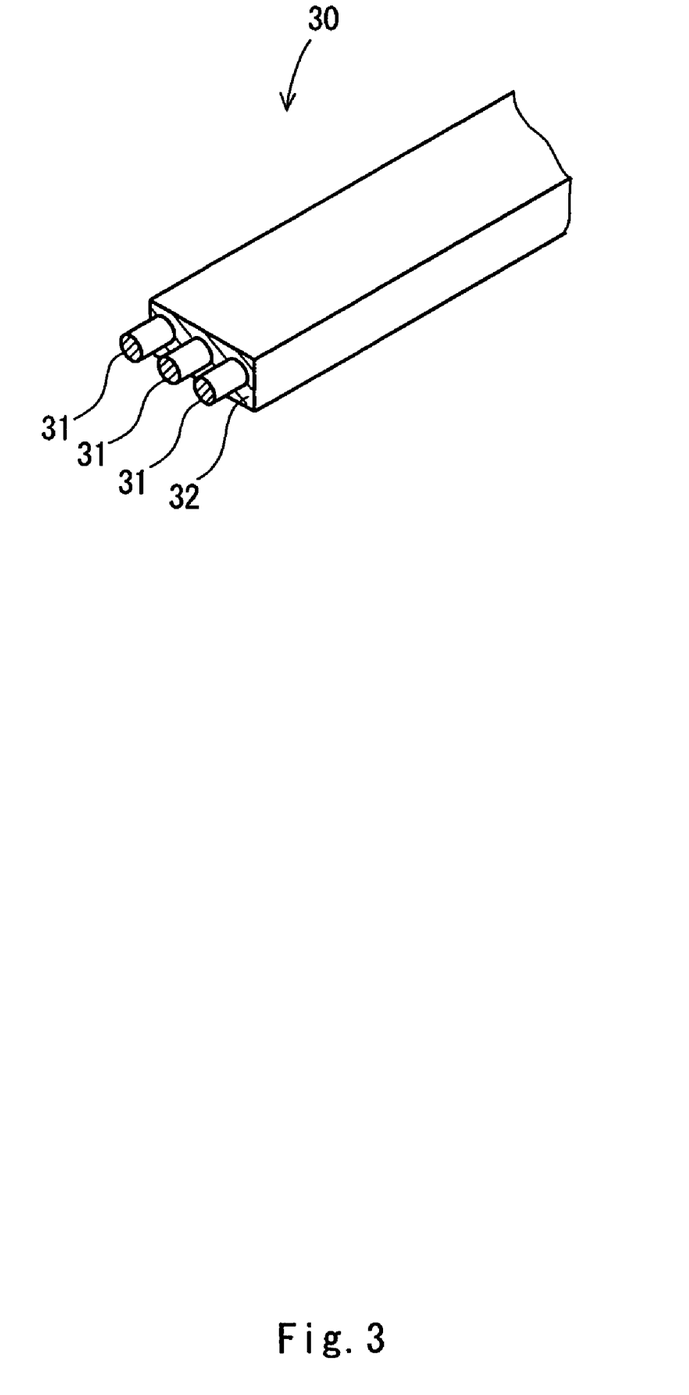
FIG. 3 is an enlarged perspective view showing the main part of a band-shaped sheet constituting the band ply of the tire according to the embodiment of the present invention.

As shown in FIG. 3, the band ply 16 is constituted by a slender band-shaped sheet 30. The band-shaped sheet 30 is obtained by covering three band cords 31 with a topping rubber sheet 32. The number of the band cords 31 is not restricted to three for the topping rubber sheet 32 but can be properly designed and changed. The band-shaped sheet 30 is wound upon the outer ply 18 along the circumferential direction (the outside in the radial direction). At this time, the band-shaped sheet 30 is wound spirally at an angle of 10 degrees or less (preferably 5 degrees or less) along the circumferential direction. Since the band-shaped sheet 30 is wound at the above-mentioned angle along the circumferential direction, the band cord 31 is provided at an angle of 10 degrees or less with respect to the equator plane E. It is sufficient that this angle has an absolute value of 10 degrees or less. Accordingly, the band cord 31 may be provided at an angle of $-10$ degrees or less with respect to the equator plane E.

The topping rubber sheet 32 is fused with other portions when the tire 10 is to be formed. Consequently, the band ply 16 is formed. In the present embodiment, the band ply 16 is formed to have 35 ends. The "ends" implies the number of the band cords 31 present within a predetermined range of the band ply 16 (a predetermined region in the transverse direction of the band ply 16). In general, the predetermined region in the transverse direction implies a region within a width of 50 mm in the band ply 16. In the present embodiment, the band cord 31 is constituted by a metal such as steel. For the material of the band cord 31, indeed, it is possible to employ organic fibers such as nylon fibers, aromatic polyamide fibers and rayon fibers in addition to the metal such as steel. In the case in which the band cord 31 is constituted by the organic fiber, the band ply 16 has an excellent flexibility. Description will be given to the functions and effects obtained by the excellent flexibility of the band ply 16.

In the tire 10 according to the present embodiment, the carcass ply 15 is formed along the tread portion 11, the shoulder portion 12 and the sidewall portion 13, and furthermore, the inner ply 17 is wound upon the bead core 22 and is then wound up along the sidewall portion 13 again. The outer ply 18 is provided to surround the fold-back portion 19 of the inner ply 17. The carcass ply 15 is reinforced by the band ply 16. Consequently, the stiffness of the sidewall portion 13 of the tire 10 can be enhanced. Furthermore, the carcass cords 26 and 28 included in the inner ply 17 and the outer ply 18 constituting the carcass ply 15 cross the tire equator plane E at an angle of 65 to 90 degrees. Consequently, the stiffness of the tread surface 20 (particularly, the stiffness of a grounded portion) can be enhanced. Accordingly, the tire 10 can maintain a stiffness required as the tire for a motorcycle and can correspond to an increase in the size and weight of the motorcycle.

The width JW of the band ply 16 is set to be 80% to 98% of the tread width TW. Therefore, the band ply 16 surrounds the inner ply 17 and the outer ply 18, and furthermore, is provided in almost the whole region of the tread surface 20 including the shoulder portion 12. Accordingly, the stiffness of the shoulder portion 12 can be enhanced so that the tire 10 can improve a cornering stability in the running of the motorcycle.

The band ply 16 is caused to overlap with the fold-back portion 19. The overlap dimension LW is set to be 15% to 35% of the width JW of the band ply 16. Consequently, the discontinuity of a structure between the shoulder portion 12 and the tread portion 11 (the structure of a boundary portion) is relaxed. More specifically, the shoulder portion 12 and the tread portion 11 are provided smoothly and continuously on a structure basis. Accordingly, the tire 10 can maintain the linearity of a running condition also for a transition period in which the motorcycle changes the running condition from straight running to cornering or from the cornering to the straight running.

In the tire 10 according to the present embodiment, thus, the straight running stability, the cornering stability, and the linearity of the running condition for a transition period between the straight running and the cornering in the running of the motorcycle can be implemented at a high level. Accordingly, the tire 10 is suitably applied to a motorcycle having a great weight and carrying out high speed running so that the handling stability and ride comfort of the motorcycle can be enhanced.

In the tire 10 according to the present embodiment, particularly, the band cord 31 constituting the band ply 16 is formed of an organic fiber or steel. Therefore, the strength of the band ply 16 can be maintained to be high. In the case in which the band cord 31 is constituted by the organic fiber, particularly, the flexibility of the band ply 16 can be enhanced as described above. Consequently, the structural discontinuity between the shoulder portion 12 and the tread portion 11 can further be relaxed. Accordingly, the tire 10 has an advantage that the linearity of the running condition can further be enhanced for the transition period in which the motorcycle changes the running condition from the straight running to the cornering or from the cornering to the straight running.

In the tire 10 according to the present embodiment, both ends of the outer ply 18 are provided on the outside in the axial direction of the fold-back portion 19. Consequently, the tire 10 has a (1–1–0) structure. In this structure, particularly, the coefficient of vertical stiffness of the tire 10 can be set to be high. For this reason, a high stiffness is not required for the sheets to be the materials constituting the inner ply 17 and the outer ply 18. In other words, there is an advantage that the degree of freedom of the design of the carcass ply 15 can be enhanced.

Figure 4:
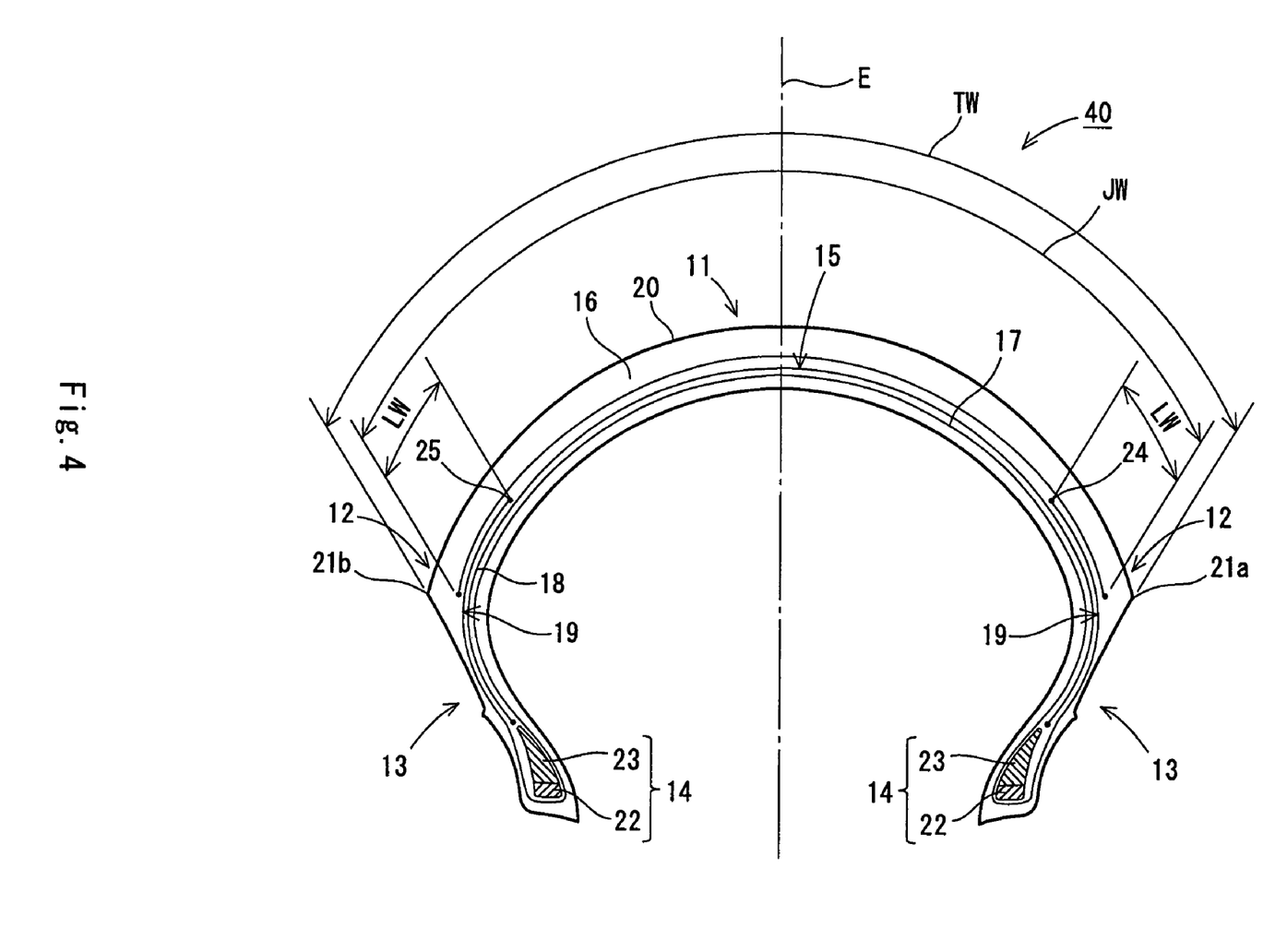
FIG. 4 is a sectional view showing the main part of a tire according to a variant of the embodiment of the present invention.

FIG. 4 shows the structure of a tire 40 according to a variant of the present embodiment. As shown in FIG. 4, the tire 40 according to the variant is different from the tire 10 in that the tire 10 has the (1–1–0) structure and the tire 40 employs a (1+1–0) structure. Other structures are the same as the structure of the tire 10.

In the tire 40, both ends of an outer ply 18 are inserted in a fold-back portion 19 of an inner ply 17. By employing the (1+1–0) structure, thus, it is possible to obtain an advantage that the weight of the tire can be reduced. Moreover, the structure can easily be produced. Consequently, there is an advantage that the productivity of the tire can be enhanced.

EXAMPLES

Although the effects of the present invention will be apparent from examples, the present invention should not be construed to be restricted to the description of the examples.

Tables 1 and 2 show results obtained by the execution of a comparison test with a conventional tire (a comparative example) for the performance evaluation (a high speed stability, a cornering stability, a transition characteristic and a ride comfort) of a tire according to each of examples 1 to 8 of the present invention.

A vehicle used in the execution of the test is a motorcycle which mounts a 4-cycle 750 cc engine and is adapted for on-road use. The tire according to each of examples and comparative examples is employed as a front tire for a test vehicle. The tire according to each of the examples and the comparative examples has a size of 120/70ZR17. A rear tire has a size of 180/55ZR17.

In the tire according to each of the examples and the comparative examples, a tread width (TW) is set to be 156 mm and a width (JW) of a band ply is set to be 136 mm. The tire according to each of the examples and the comparative examples is attached to a rim of MT17×3.50 at an internal pressure of 250 kPa. The rear tire is attached to a rim of MT17×5.50 at an internal pressure of 290 kPa. A running test was carried out over a dry pavement (a dry asphalt road).

The comparison test compares a high speed stability, a cornering stability, a transition characteristic (a handling condition for a transition period from straight running to cornering and a handling condition for a transition period from the cornering to the straight running) and a ride comfort in the running of the test vehicle. The rear tire of the test vehicle was set to be invariable and data on the front tire were changed as follows, and the comparison test was thus carried out by the subjective evaluation of a test rider. The subjective evaluation of the test rider is expressed in relative evaluation (grade) on the basis of five points. Each of the tires corresponds to each of the examples and the comparative examples. The details of the tire according to each of the examples and the comparative examples are as follows.

Example 1

The number of inner plies constituting a carcass ply is one. A carcass cord constituting the inner ply is formed by 2/1440dtex (nylon). The direction of the carcass cord forms an angle of 67 degrees with respect to a tire equator plane. A carcass cord constituting an outer ply is formed by 2/1440dtex (nylon) . The direction of the carcass cord forms an angle of −67 degrees with respect to the tire equator plane. The carcass has a (1+1−0) structure. The number of band plies is one. A band cord is formed of 3×3/0.17 steel. The band ply has 35 ends. A width JW of the band ply is 87% of a tread width TW. An overlap dimension LW of the band ply and the fold-back portion of the inner ply is 17% of the width JW of the band ply.

Example 2

The number of inner plies constituting a carcass ply is one. A carcass cord constituting the inner ply is formed by 2/1440dtex (nylon). The direction of the carcass cord forms an angle of 88 degrees with respect to a tire equator plane. A carcass cord constituting an outer ply is formed by 2/1440dtex (nylon). The direction of the carcass cord forms an angle of −88 degrees with respect to the tire equator plane. The carcass has a (1+1−0) structure. The number of band plies is one. A band cord is formed of 3×3/0.17 steel. The band ply has 35 ends. A width JW of the band ply is 87% of a tread width TW. An overlap dimension LW of the band ply and the fold-back portion of the inner ply is 17% of the width JW of the band ply.

Example 3

The number of inner plies constituting a carcass ply is one. A carcass cord constituting the inner ply is formed by 2/1440dtex (nylon). The direction of the carcass cord forms an angle of 80 degrees with respect to a tire equator plane. A carcass cord constituting an outer ply is formed by 2/1440dtex (nylon). The direction of the carcass cord forms an angle of −80 degrees with respect to the tire equator plane. The carcass has a (1+1−0) structure. The number of band plies is one. A band cord is formed of 3×3/0.17 steel. The band ply has 35 ends. A width JW of the band ply is 87% of a tread width TW. An overlap dimension LW of the band ply and the fold-back portion of the inner ply is 17% of the width JW of the band ply.

Example 4

The number of inner plies constituting a carcass ply is one. A carcass cord constituting the inner ply is formed by 2/1440dtex (nylon). The direction of the carcass cord forms an angle of 67 degrees with respect to a tire equator plane. A carcass cord constituting an outer ply is formed by 2/1440dtex (nylon). The direction of the carcass cord forms an angle of −67 degrees with respect to the tire equator plane. The carcass has a (1+1−0) structure. The number of band plies is one. A band cord is formed of 3×3/0.17 steel. The band ply has 35 ends. A width JW of the band ply is 87% of a tread width TW. An overlap dimension LW of the band ply and the fold-back portion of the inner ply is 30% of the width JW of the band ply.

Example 5

The number of inner plies constituting a carcass ply is one. A carcass cord constituting the inner ply is formed by 2/1440dtex (nylon). The direction of the carcass cord forms an angle of 67 degrees with respect to a tire equator plane. A carcass cord constituting an outer ply is formed by 2/1440dtex (nylon). The direction of the carcass cord forms an angle of −67 degrees with respect to the tire equator plane. The carcass has a (1+1−0) structure. The number of band plies is one. A band cord is formed of 3×3/0.17 steel. The band ply has 35 ends. A width JW of the band ply is 87% of a tread width TW. An overlap dimension LW of the band ply and the fold-back portion of the inner ply is 25% of the width JW of the band ply.

Example 6

The number of inner plies constituting a carcass ply is one. A carcass cord constituting the inner ply is formed by 2/1440dtex (nylon). The direction of the carcass cord forms an angle of 88 degrees with respect to a tire equator plane. A carcass cord constituting an outer ply is formed by 2/1440dtex (nylon) . The direction of the carcass cord forms an angle of −80 degrees with respect to the tire equator plane. The carcass has a (1+1−0) structure. The number of band plies is one. A band cord is formed of 3×3/0.17 steel. The band ply has 35 ends. A width JW of the band ply is 87% of a tread width TW. An overlap dimension LW of the band ply and the fold-back portion of the inner ply is 17% of the width JW of the band ply.

Example 7

The number of inner plies constituting a carcass ply is one. A carcass cord constituting the inner ply is formed by 2/1440dtex (nylon). The direction of the carcass cord forms an angle of 67 degrees with respect to a tire equator plane. A carcass cord constituting an outer ply is formed by 2/1440dtex (nylon). The direction of the carcass cord forms an angle of −67 degrees with respect to the tire equator plane. The carcass has a (1+1−0) structure. The number of band plies is one. A band cord is formed of 3×3/0.23 steel. The band ply has 35 ends. A width JW of the band ply is 87% of a tread width TW. An overlap dimension LW of the band ply and the fold-back portion of the inner ply is 17% of the width JW of the band ply.

Example 8

The number of inner plies constituting a carcass ply is one. A carcass cord constituting the inner ply is formed by 2/1440dtex (nylon) . The direction of the carcass cord forms an angle of 67 degrees with respect to a tire equator plane. A carcass cord constituting an outer ply is formed by 2/1440dtex (nylon) . The direction of the carcass cord forms an angle of −67 degrees with respect to the tire equator plane. In the Example 8, the outer ply is inserted in the inner ply. Accordingly, the carcass has a (1−1−0) structure. The number of band plies is one. A band cord is formed of 3×3/0.17 steel. The band ply has 35 ends. A width JW of the band ply is 87% of a tread width TW. An overlap dimension LW of the band ply and the fold-back portion of the inner ply is 17% of the width JW of the band ply.

Comparative Example 1

A carcass ply has a single ply. A carcass cord constituting the carcass ply is formed by 2/1440dtex (nylon). The direction of the carcass cord forms an angle of 90 degrees with respect to a tire equator plane. Accordingly, the carcass has a (1–0) structure. The number of band plies is one. A band cord is formed of 3×3/0.17 steel. The band ply has 35 ends. A width JW of the band ply is 87% of a tread width TW. An overlap dimension LW of the band ply and the fold-back portion of the carcass ply is 10% of the width JW of the band ply.

Comparative Example 2

A carcass ply has a single ply. A carcass cord constituting the carcass ply is formed by 2/1440dtex (nylon). The direction of the carcass cord forms an angle of 90 degrees with respect to a tire equator plane. Accordingly, the carcass has a (1–0) structure. The number of band plies is one. A band cord is formed of 3×3/0.17 steel. The band ply has 35 ends. A width JW of the band ply is 87% of a tread width TW. An overlap dimension LW of the band ply and the fold-back portion of the carcass ply is 20% of the width JW of the band ply.

Comparative Example 3

The number of carcass plies is two. A carcass cord constituting the carcass ply is formed by 2/1440dtex (nylon). The direction of the carcass cord forms an angle of 90 degrees with respect to a tire equator plane. Accordingly, the carcass has a (2–0) structure. The number of band plies is one. A band cord is formed of 3×3/0.17 steel. The band ply has 35 ends. A width JW of the band ply is 87% of a tread width TW. An overlap dimension LW of the band ply and the fold-back portion of the carcass ply is 0% of the width JW of the band ply. In other words, the band ply and the carcass ply do not overlap with each other.

Comparative Example 4

The number of inner plies constituting a carcass ply is one. A carcass cord constituting the inner ply is formed by 2/1440dtex (nylon). The direction of the carcass cord forms an angle of 62 degrees with respect to a tire equator plane. A carcass cord constituting an outer ply is formed by 2/1440dtex (nylon). The direction of the carcass cord forms an angle of −62 degrees with respect to the tire equator plane. Accordingly, the carcass has a (1+1–0) structure. The number of band plies is one. A band cord is formed of 3×3/0.17 steel. The band ply has 35 ends. A width JW of the band ply is 87% of a tread width TW. An overlap dimension LW of the band ply and the fold-back portion of the inner ply is 17% of the width JW of the band ply.

Comparative Example 5

The number of inner plies constituting a carcass ply is one. A carcass cord constituting the inner ply is formed by 2/1440dtex (nylon). The direction of the carcass cord forms an angle of 67 degrees with respect to a tire equator plane. A carcass cord constituting an outer ply is formed by 2/1440dtex (nylon). The direction of the carcass cord forms an angle of −67 degrees with respect to the tire equator plane. Accordingly, the carcass has a (1+1–0) structure. The number of band plies is one. A band cord is formed of 3×3/0.17 steel. The band ply has 35 ends. A width JW of the band ply is 87% of a tread width TW. An overlap dimension LW of the band ply and the fold-back portion of the inner ply is 40% of the width JW of the band ply.

Comparative Example 6

The number of inner plies constituting a carcass ply is one. A carcass cord constituting the inner ply is formed by 2/1440dtex (nylon). The direction of the carcass cord forms an angle of 67 degrees with respect to a tire equator plane. A carcass cord constituting an outer ply is formed by 2/1440dtex (nylon). The direction of the carcass cord forms an angle of −67 degrees with respect to the tire equator plane. Accordingly, the carcass has a (1+1–0) structure. The number of band plies is one. A band cord is formed of 3×3/0.17 steel. The band ply has 35 ends. A width JW of the band ply is 87% of a tread width TW. An overlap dimension LW of the band ply and the fold-back portion of the inner ply is 10% of the width JW of the band ply.

Comparative Example 7

The number of inner plies constituting a carcass ply is one. A carcass cord constituting the inner ply is formed by 2/1440dtex (nylon). The direction of the carcass cord forms an angle of 67 degrees with respect to a tire equator plane. A carcass cord constituting an outer ply is formed by 2/1440dtex (nylon). The direction of the carcass cord forms an angle of −67 degrees with respect to the tire equator plane. Accordingly, the carcass has a (1+1–0) structure. The number of band plies is one. A band cord is formed of 3×3/0.17 steel. The band ply has 35 ends. A width JW of the band ply is 75% of a tread width TW. An overlap dimension LW of the band ply and the fold-back portion of the inner ply is 17% of the width JW of the band ply.

TABLE 1

| | | Comparative example 1 | Comparative example 2 | Comparative example 3 | Example 1 | Example 2 | Example 3 | Comparative example 4 |
|---|---|---|---|---|---|---|---|---|
| Inner ply | Material | Nylon | Nylon | Nylon | Nylon | Nylon | Nylon | Nylon |
| | Fineness | 2/1440 d | 2/1440 d | 2/1440 d | 2/1440 d | 2/1440 d | 2/1440 d | 2/1440 d |
| | Inclination angle (to equator plane) | 90° | 90° | 90° | 67° | 88° | 80° | 62° |
| | Number of sheets | 1 | 1 | 2 | 1 | 1 | 1 | 1 |
| | Structure | 1 − 0 structure | 1 − 0 structure | 2 − 0 structure | 1 + 1 − 0 structure | 1 + 1 − 0 structure | 1 + 1 − 0 structure | 1 + 1 − 0 structure |

TABLE 1-continued

|  |  | Comparative example 1 | Comparative example 2 | Comparative example 3 | Example 1 | Example 2 | Example 3 | Comparative example 4 |
|---|---|---|---|---|---|---|---|---|
| Outer ply | Material | — | — | — | Nylon | Nylon | Nylon | Nylon |
|  | Fineness | — | — | — | 2/1440 d | 2/1440 d | 2/1440 d | 2/1440 d |
|  | Inclination angle (to equator plane) | — | — | — | −67° | −88° | −80° | −62° |
| Band | Number of sheets | 1 | 1 | 1 | 1 | 1 | 1 | 1 |
|  | Material | Steel | Steel | Steel | Steel | Steel | Steel | Steel |
|  | Structure | 3 × 3/0.17 | 3 × 3/0.17 | 3 × 3/0.17 | 3 × 3/0.17 | 3 × 3/0.17 | 3 × 3/0.17 | 3 × 3/0.17 |
|  | Ends each/50 mm | 35 | 35 | 35 | 35 | 35 | 35 | 35 |
|  | Width % | 87 | 87 | 87 | 87 | 87 | 87 | 87 |
| Overlap LW % |  | 10 | 20 | 0 | 17 | 17 | 17 | 17 |
| Handling stability | High speed stability | 3.5 | 3.5 | 4.0 | 4.2 | 4.2 | 4.2 | 4.2 |
|  | Cornering | 3.0 | 3.5 | 3.8 | 4.0 | 3.8 | 3.8 | 4.2 |
|  | Transition characteristic | 4.0 | 3.5 | 4.0 | 4.5 | 4.5 | 4.5 | 4.0 |
| Ride comfort |  | 4.0 | 4.0 | 3.5 | 4.0 | 4.5 | 4.2 | 3.0 |

TABLE 2

|  |  | Example 4 | Example 5 | Comparative example 5 | Comparative example 6 | Comparative example 7 | Example 6 | Example 7 | Example 8 |
|---|---|---|---|---|---|---|---|---|---|
| Inner ply | Material | Nylon | Nylon | Nylon | Nylon | Nylon | Nylon | Nylon | Nylon |
|  | Fineness | 2/1440 d | 2/1440 d | 2/1440 d | 2/1440 d | 2/1440 d | 2/1440 d | 2/1440 d | 2/1440 d |
|  | Inclination angle (to equator plane) | 67° | 67° | 67° | 67° | 67° | 88° | 67° | 67° |
|  | Number of sheets | 1 | 1 | 1 | 1 | 1 | 1 | 1 | 1 |
|  | Structure | 1 + 1 − 0 structure | 1 + 1 − 0 structure | 1 + 1 − 0 structure | 1 + 1 − 0 structure | 1 + 1 − 0 structure | 1 + 1 − 0 structure | 1 + 1 − 0 structure | 1 − 1 − 0 structure |
| Outer ply | Material | Nylon | Nylon | Nylon | Nylon | Nylon | Nylon | Nylon | Nylon |
|  | Fineness | 2/1440 d | 2/1440 d | 2/1440 d | 2/1440 d | 2/1440 d | 2/1440 d | 2/1440 d | 2/1440 d |
|  | Inclination angle (to equator plane) | −67° | −67° | −67° | −67° | −67° | 80° | −67° | −67° |
| Band | Number of sheets | 1 | 1 | 1 | 1 | 1 | 1 | 1 | 1 |
|  | Material | Steel | Steel | Steel | Steel | Steel | Steel | Steel | Steel |
|  | Structure | 3 × 3/0.17 | 3 × 3/0.17 | 3 × 3/0.17 | 3 × 3/0.17 | 3 × 3/0.17 | 3 × 3/0.17 | 3 × 3/0.23 | 3 × 3/0.17 |
|  | Ends each/50 mm | 35 | 35 | 35 | 35 | 35 | 35 | 35 | 35 |
|  | Width % | 87 | 87 | 87 | 87 | 75 | 87 | 87 | 87 |
| Overlap LW % |  | 30 | 25 | 40 | 10 | 17 | 17 | 17 | 17 |
| Handling stability | High speed stability | 4.2 | 4.2 | 4.2 | 3.3 | 3.0 | 4.2 | 4.2 | 4.2 |
|  | Conering | 4.5 | 4.5 | 4.0 | 3.0 | 2.8 | 4.5 | 4.0 | 4.5 |
|  | Transition characteristic | 4.0 | 4.0 | 4.0 | 3.5 | 4.0 | 4.5 | 4.0 | 4.5 |
| Ride comfort |  | 4.0 | 4.0 | 3.5 | 4.0 | 4.5 | 4.5 | 4.0 | 4.5 |

As shown in the Tables 1 and 2, the result of evaluation in each of the examples is more advantageous than that in each of the comparative examples. The direction of the carcass cord constituting the inner ply and the outer ply is particularly set to have an absolute value of 67 to 88 degrees with respect to the tire equator plane, the width JW of the band ply is particularly set to be 87% of the tread width TW, and the overlap dimension LW of the band ply and the inner ply is particularly set to be 17% to 30% of the width JW of the band ply. Consequently, it is possible to enhance the straight running stability (the high speed stability), the cornering stability and the mutual transition characteristics of a straight running condition and a cornering condition in the motorcycle. In addition, the handling stability and the ride comfort can be improved.

In the case in which the carcass has the structure of (1+1−0) or (1−1−0), the straight running stability, the cornering stability and the transition characteristics can be enhanced. In the case in which an actual manufacturing procedure is taken into consideration, there is an advantage that the (1+1−0) structure can enhance a production efficiency.

What is claimed is:

1. A tire for a motorcycle comprising:
    a first carcass ply formed along a tread surface and provided with a fold-back portion by winding upon a pair of bead cores disposed opposite to each other in an axial direction of the tire from an inside toward an outside in the axial direction of the tire;
    a second carcass ply formed along the tread surface and provided on an outside of the first carcass ply in a radial direction of the tire, said second carcass ply not winding upon the bead cores; and
    a band ply formed along the tread surface and provided on an outside of the second carcass ply in the radial direction of the tire,
    wherein each of the first and second carcass plies has a carcass cord provided to cross a tire equator plane at an angle having an absolute value of 65 to 90 degrees,
    the band ply has a band cord which crosses the tire equator plane at an angle having an absolute value of 10 degrees or less and is wound spirally, and
    the band ply is provided in such a manner that a width is set to be 80% to 98% of a tread width and an overlap dimension with the fold-back portion of the first carcass ply is set to be 15% to 35% of the width of the band ply.

2. The tire for a motorcycle according to claim 1, wherein the band cord is formed of an organic fiber or steel.

3. The tire for a motorcycle according to claim 1 or 2, wherein an end of the second carcass ply is inserted in the fold-back portion of the first carcass ply.

4. A tire for a motorcycle comprising:
a first carcass ply formed along a tread surface and provided with a fold-back portion by winding upon a pair of bead cores disposed opposite to each other in an axial direction of the tire from an inside toward an outside in the axial direction of the tire;
a second carcass ply formed along the tread surface and provided on an outside of the first carcass ply in a radial direction of the tire; and
a band ply formed along the tread surface and provided on an outside of the second carcass ply in the radial direction of the tire, wherein an end of the second carcass ply is provided on an outside of the fold-back portion of the first carcass ply in the axial direction of the tire; and,
wherein each of the first and second carcass plies has a carcass cord provided to cross a tire equator plane at an angle having an absolute value of 65 to 90 degrees,
the band ply has a band cord which crosses the tire equator plane at an angle having an absolute value of 10 degrees or less and is wound spirally, and
the band ply is provided in such a manner that a width is set to be 80% to 98% of a tread width and an overlap dimension with the fold-back portion of the first carcass ply is set to be 15% to 35% of the width of the band ply.

5. The tire for a motorcycle according to claim 4, wherein the band cord is formed of an organic fiber or steel.

* * * * *